United States Patent [19]

Cloeren

[11] Patent Number: 4,533,308
[45] Date of Patent: Aug. 6, 1985

[54] MULTIMANIFOLD EXTRUSION DIE AND COEXTRUSION PROCESS

[76] Inventor: Peter Cloeren, 2206 N. 16th St., Orange, Tex. 77630

[21] Appl. No.: 604,995

[22] Filed: Apr. 27, 1984

Related U.S. Application Data

[63] Continuation-in-part of Ser. No. 600,961, Apr. 16, 1984, abandoned.

[51] Int. Cl.³ ............................................. A21C 3/00
[52] U.S. Cl. ............................... 425/131.1; 264/171; 425/133.1; 425/133.5
[58] Field of Search .................. 264/171; 425/131.1, 425/133.1, 133.5, 462

[56] References Cited

U.S. PATENT DOCUMENTS

| | | | |
|---|---|---|---|
| 3,584,341 | 6/1971 | Fairbanks | 425/131.1 |
| 3,694,119 | 9/1972 | Scheibling | 264/171 |
| 3,792,945 | 2/1974 | Randall | 425/462 |
| 3,877,857 | 4/1975 | Melead | 425/133.5 |
| 4,152,387 | 5/1979 | Cloeren | 425/133.5 |
| 4,197,069 | 4/1980 | Cloeren | 425/131.1 |
| 4,344,907 | 8/1982 | Herrington | 425/133.1 |

Primary Examiner—Jay H. Woo
Assistant Examiner—Timothy W. Heitbrink
Attorney, Agent, or Firm—Timothy R. Kroboth

[57] ABSTRACT

A multimanifold extrusion die that minimizes or eliminates the curtaining effect is provided. This die furthermore also provides for convergence of molten thermoplastic streams at substantially equal flow velocities without external adjustment of the die. More specifically, this die has a self-balancing feature that is responsive to a flow rate differential. Also provided by this invention is a process for minimizing or eliminating the curtaining effect in the melt-lamination of thermoplastic materials.

5 Claims, 6 Drawing Figures

MULTIMANIFOLD EXTRUSION DIE AND COEXTRUSION PROCESS

REFERENCE TO RELATED APPLICATIONS

This application is a continuation-in-part of patent application Ser. No. 600,961 filed on Apr. 16, 1984 now abandoned.

TECHNICAL FIELD

The present invention relates to the melt-lamination of thermoplastic materials. More specifically, this invention relates to overcoming the curtaining effect, and in addition to providing for convergence of molten thermoplastic streams at substantially equal flow velocities without external die adjustment.

BACKGROUND ART

The existence of the curtaining effect in an extruded thermoplastic layer is a problem that has long needed a solution. FIG. 1 depicts a two layer laminate of thermoplastic materials, in which the curtaining effect is shown to be present in both layers. As explained in detail below, the convergence of molten thermoplastic streams at substantially equal flow velocities in an extrusion die is known. However, a problem is that external adjustment of the die is required. The present invention is concerned with overcoming these problems in a multimanifold extrusion die.

As exemplified by U.S. Pat. No. 3,877,857 to Melead, multiple melt chamber extrusion dies are known. This type of die has two die halves between which a center divider extends, and has in each die half an upstream and downstream melt or manifold chamber connected by a communicating channel having a narrow cross-sectional area. A molten stream flows from the downstream manifold chamber through a second channel having a narrow cross-sectional area, and then converges with another molten stream to form a melt-laminate.

Also known, as illustrated by U.S. Pat. No. 3,694,119 to Scheibling, is an extrusion nozzle having a central tongue separating two flow passages that terminate at a discharge slot. In a special embodiment of the extrusion nozzle, the feed channels for the molten thermoplastic materials and/or the longitudinal slits connected to these channels are of such a construction that their cross-section is reduced toward the center of the channels and/or slits, and it is stated that this causes an improvement of the distribution of pressure in the material issuing from the extruders, so that very uniform layers are produced. In one embodiment of the nozzle, a molten thermoplastic stream flows through a pair of distribution channels joined by a narrow flow passage channel.

As exemplified by U.S. Pat. No. 4,344,907 to Herrington, a co-axial tubular extrusion die is known that has a flow restriction in the flow path of the lower viscosity resin to increase the pressure drop of the resin as it passes through the die. Separating the two flow paths of this die is a divider having a wall that in part forms the flow restriction.

Also known, as illustrated by FIG. 3 of my U.S. Pat. Nos. 4,152,387 and 4,197,069, is a multimanifold coextrusion die having an adjustable divider provided between any two of the flow channels thereof. Each flow channel includes a back pressure cavity and a flow restriction channel located between the back pressure cavity and the point of convergence of the flow channels. This coextrusion die provides for adjustment of flow restriction channel width so as to cause the converging molten thermoplastic streams to converge at substantially equal flow velocities, by manual manipulation of the adjustable divider. As a result, this die promotes laminar flow at the point of convergence. However, a drawback of this multimanifold extrusion die is that the layers of a laminate produced thereby, exhibit the curtaining effect. Furthermore, even though the convergence of melt streams is effected at substantially equal flow velocities, external adjustment of the divider is required. Hence, there is a need for a multimanifold extrusion die that minimizes or eliminates the curtaining effect, in addition to retaining the advances in the art provided by the prior art die of FIG. 3 of U.S. Pat. Nos. 4,152,387 and 4,197,069. Such an improved die would be especially remarkable if it were capable of overcoming the curtaining effect for resins of varying viscosities and hence varying flow rates, merely by removal of and replacement of a component thereof with an interchangeable component precisely configured for a specific resin viscosity. Moreover, there is a need for a multimanifold extrusion die that in addition automatically provides for convergence of molten thermoplastic streams at substantially equal flow velocities. Such a die would make possible an improved process for melt-lamination of thermoplastic materials.

SUMMARY OF THE INVENTION

It is accordingly an object of the present invention to provide a multimanifold die that minimizes or eliminates the curtaining effect, in addition to retaining the advances in the art provided by the prior art die of FIG. 3 of U.S. Pat. Nos. 4,152,387 and 4,197,069.

It is a further object of the present invention to provide a multimanifold die of this type that is capable of overcoming the curtaining effect for resins of varying viscosities, merely by removal and replacement of a component thereof with an interchangeable component precisely configured for a specific resin viscosity.

It is an even further object to provide a die of this type that in addition provides for convergence of molten thermoplastic streams at substantially equal flow velocities without external adjustment.

It is an additional object to provide an improved process for melt-lamination of thermoplastic materials by which the curtaining effect is minimized or eliminated.

Additional objects, advantages and novel features of the present invention are set forth in the description that follows, and in part will become apparent to those skilled in the art upon examination of the following description or may be learned by practice of the invention.

To achieve the foregoing objects and in accordance with the purpose of the present invention, as embodied and broadly described herein, there is provided a multimanifold extrusion die for minimizing or eliminating the curtaining effect that moreover provides for convergence of molten thermoplastic streams at substantially equal flow velocities without external adjustment. This die includes a first and a second flow channel, which traverse the die and eventually converge at a point of convergence within the die, and further includes a free floating, pivoting divider means disposed between the flow channels.

Each of the flow channels includes a manifold chamber situated upstream from the divider, and further includes in descending downstream order, a pressure compensating restriction channel, an expansion chamber, and a tapered flow restriction channel. The pressure compensating restriction channel is formed in part by a head portion of the divider. The expansion chamber has a cross-sectional area greater than that of any cross-section of the pressure compensating restriction channel, and is also of greater cross-sectional area than the tapered flow restriction channel.

The manifold chamber has a longitudinal dimension of sufficient magnitude that a molten thermoplastic stream exiting from the manifold chamber is at a relatively greater pressure at a side-to-side midpoint than at the sides thereof. The pressure compensating restriction channel is of increasing cross-sectional area from the center to each end thereof so as to provide inverse resistance to flow whereby the molten stream, which is flowing at relatively greater pressure at the midpoint prior to flowing through the pressure compensating restriction channel, is caused to exit from this channel at substantially equal pressure from side to side.

The expansion chamber and the tapered flow restriction channel each have a longitudinal dimension that maintains the molten stream at the substantially equal flow pressure.

A molten stream exits at the substantially equal flow pressure from the tapered flow restriction channel of each of the flow channels. Convergence of the molten streams forms a layered melt stream that flows at substantially equal pressure from side to side.

The free floating divider automatically pivots in response to any difference between the flow rates of the molten streams. As a result, convergence of the streams is at substantially equal flow velocities.

Also provided by the present invention is a process using a multimanifold extrusion die that minimizes or eliminates the curtaining effect in the melt-lamination of thermoplastic materials. This process includes subjecting a molten thermoplastic stream that is flowing at a relatively greater pressure at a side-to-side midpoint than at the sides thereof, to an inverse resistance to flow whereby the molten stream is caused to flow at substantially equal pressure from side to side. The cross-sectional thickness of the molten stream is then expanded, while the substantially equal flow pressure is maintained. Next, the cross-sectional thickness of the expanded stream is thinned to a desired cross-sectional dimension, while the substantially equal flow pressure is still maintained. The thinned molten stream is then converged with at least one other thinned stream that is flowing at substantially equal pressure from side to side. The substantially equal flow pressure is maintained for each stream of the resulting melt-laminate until the melt-laminate exits from the extrusion die.

In the drawing and in the detailed description of the invention that follows, I have shown and essentially described only a preferred embodiment of my invention, simply by way of illustration of the best mode contemplated by me of carrying out my invention. As will be realized, my invention is capable of other and different embodiments, and its several details are capable of modification in various respects, all without departing from the invention. Accordingly, the drawing and detailed description are to be regarded as illustrative in nature, and not as restrictive.

BRIEF DESCRIPTION OF THE DRAWING

Reference is now made to the accompanying drawing which forms a part of the specification of the present invention, and which depicts a preferred embodiment of a multimanifold extrusion die in accordance with the present invention.

DETAILED DESCRIPTION OF THE INVENTION

As explained above, the present invention is directed to an improved multimanifold extrusion die and to an improved process for the melt-lamination of thermoplastic materials. More particularly, this invention minimizes or eliminates the curtaining effect, a well known defect in the layers of a thermoplastic laminate. A long-felt need met by the present invention is that it minimizes or eliminates the curtaining effect, while at the same time it retains the advances in the art provided by the prior art die of FIG. 3 of U.S. Pat. Nos. 4,152,387 and 4,197,069. Moreover, this improved die does not require external adjustment for convergence of molten thermoplastic streams at substantially equal flow velocities. Rather, it has a self-balancing feature.

Beneficially, the present invention is useful in forming a laminate from thermoplastic materials having similar or dissimilar flow properties. Exemplary thermoplastic materials include, but are not limited to, low- and high-density polyethylene, polypropylene, polycarbonates, polyamides, polyvinylchloride, polyvinylidene chloride, polystyrene, polyvinylacetate, polyacrylonitrile and copolymers thereof.

Figure 1:
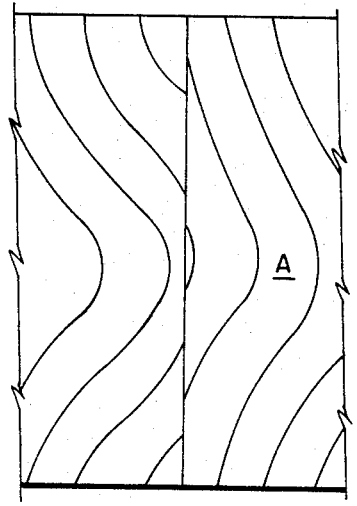
FIG. 1 is a top view of a fragmentary portion of a two layer laminate, with a portion of an upper layer A removed, which shows the presence of the curtaining effect in each layer.
Figure 3:
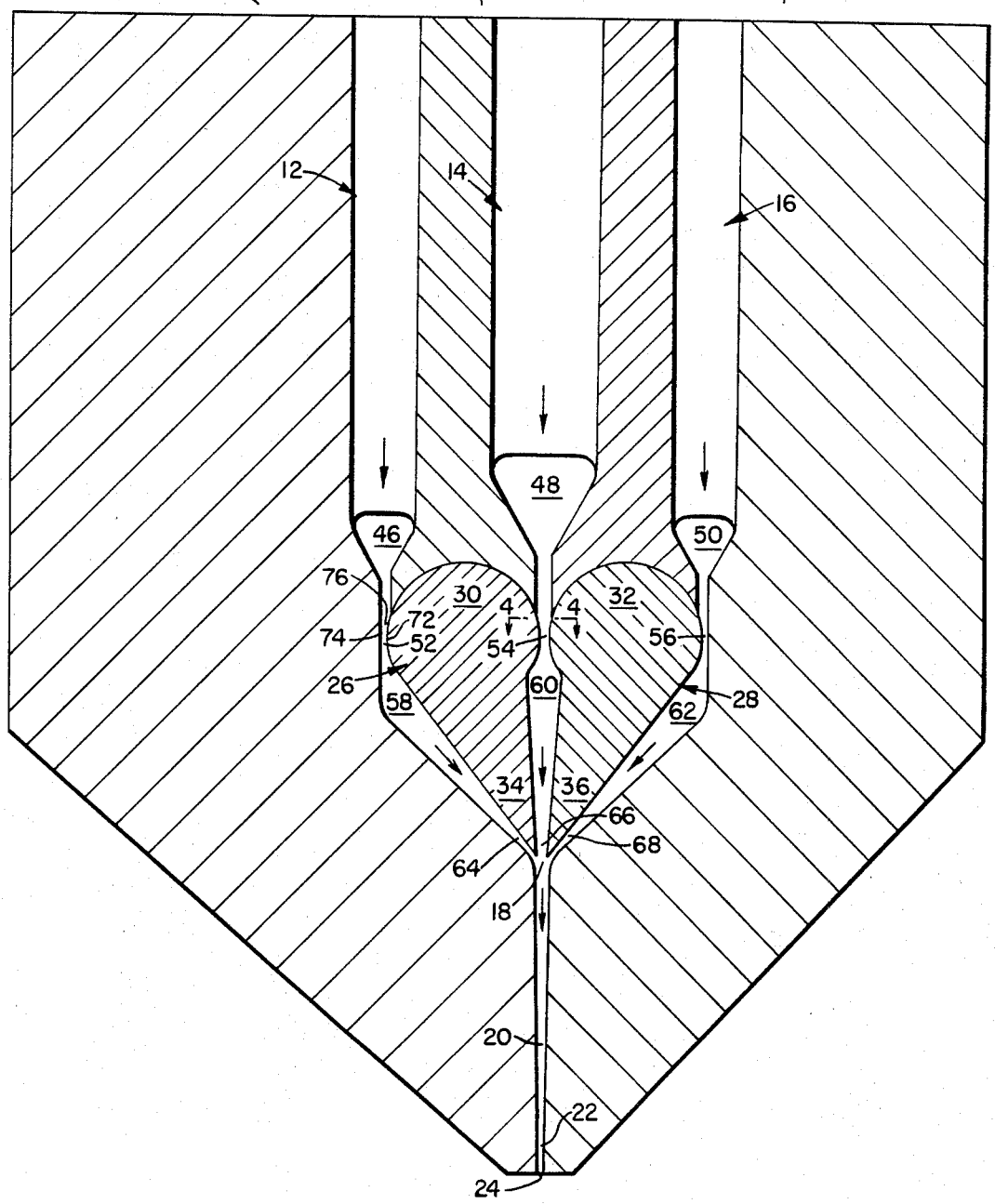
FIG. 3 is a cross-sectional view at mid-center of the die of FIG. 2, which shows a decreased cross-sectional area for each of the pressure compensating restriction channels vis-a-vis the respective cross-sectional areas as shown in FIG. 2.
Figure 2:
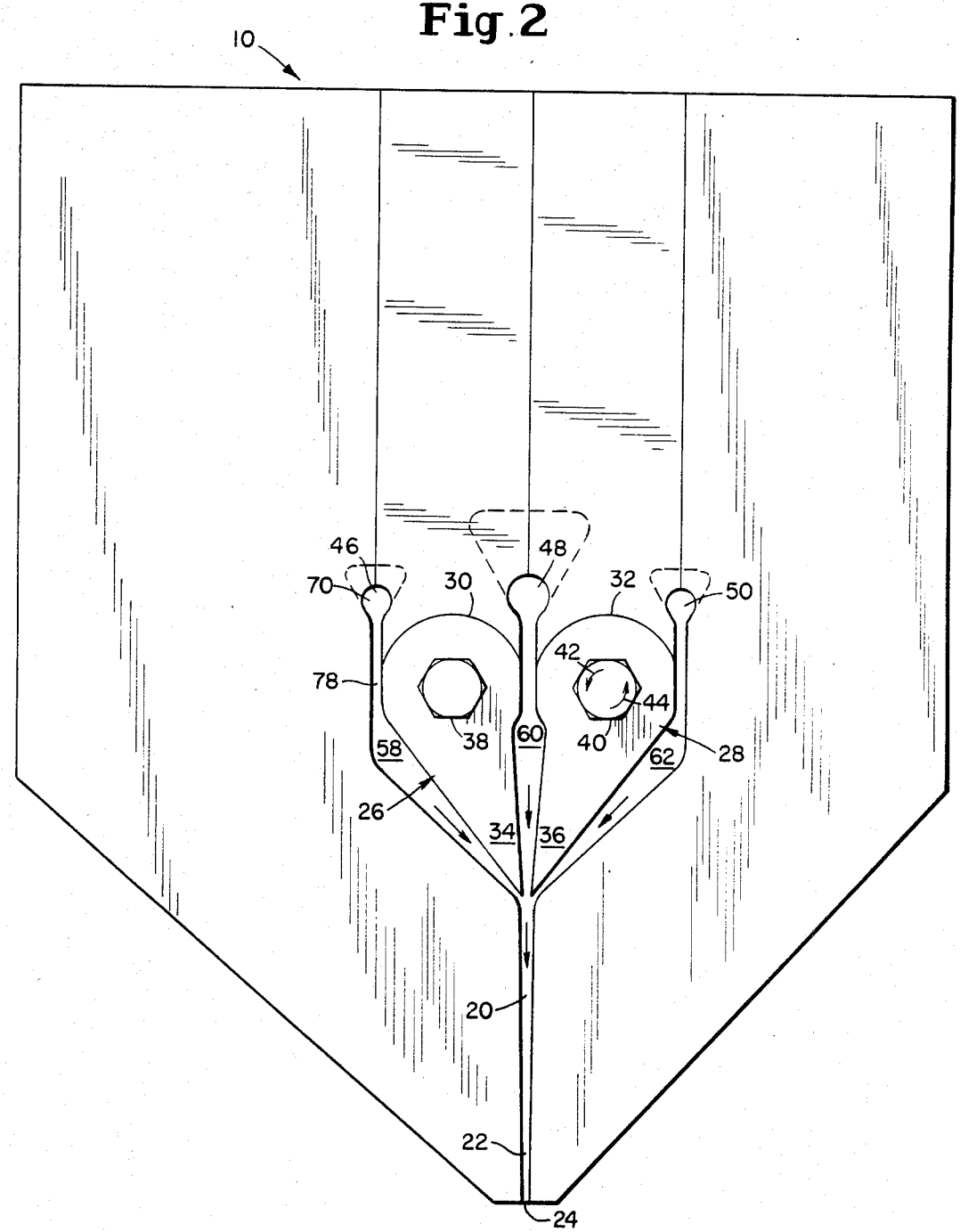
FIG. 2 is a view with an end plate removed of a preferred three layer multimanifold extrusion die in accordance with the present invention.

Referring to FIGS. 2 and 3, a preferred multimanifold extrusion die 10 in accordance with the present invention is shown. Die 10 provides for the passage of three thermoplastic streams through flow channels 12, 14 and 16, and for the convergence of these streams at a point of convergence 18 to form a three layer melt-laminate. It will be understood that a die in accordance with the present invention may be used to form, for example, a two layer, five layer or seven layer laminate, or may even be used to form a laminate having a greater number of layers.

The melt-laminate is passed through an exit channel that consists of a preland channel 20, which is advantageously tapered, and a land channel 22, which typically has parallel walls when viewed in cross-section. The melt-laminate exits from the exit channel of die 10 at an opening 24.

Situated between flow channels 12 and 14 is a free floating, pivoting divider or vane blade 26 and between flow channels 14 and 16 is a free floating, pivoting divider or vane blade 28. Dividers 26 and 28 have head portions 30 and 32, and point portions 34 and 36, as shown. At one end of each divider is a round shaft (not shown), which pivots in a bearing (also not shown). Each divider is permitted to pivot freely in response to any difference between the flow rates of the molten streams passing through the adjacent flow channels, which are, for example, channels 12 and 14 in the case of divider 26.

Each flow channel includes a manifold chamber, shown as 46, 48 and 50; a pressure compensating restriction channel, indicated as 52, 54 and 56; an expansion chamber, designated as 58, 60 and 62; and a flow restriction channel, numbered as 64, 66 and 68.

For simplicity, the below description will be in terms of the features of one of these flow channels, but it will be understood to apply to the other two flow channels of die 10. Manifold chamber or manifold 46 is located upstream from divider 26 and is a coat-hanger type manifold, that is, it has a cross-sectional area that diminishes from the center to each end thereof. This characteristic of manifold 46 is revealed by comparison of the cross-sectional area of manifold 46 in FIG. 3 with the cross-sectional area of manifold 46 in FIG. 2, which shows an end 70 of manifold 46. The manifold may be of constant or variable cross-section depending upon, for example, individual thermoplastic material requirements. A manifold having a constant cross-section from end to end is known as a keyhole type manifold. The residence time of a thermoplastic material is greater in a keyhole type manifold than in a coat-hanger type manifold. Accordingly, the latter type is preferred where, for example, it is advantageous for residence time to be as short as possible due to, for purposes of illustration, thermal sensitivity. Also, the coat-hanger type may be preferred over the keyhole type for the reason that a previously used thermoplastic material is more rapidly cleaned from this manifold, as a new thermoplastic material flows through.

In the manifold, transverse flow of a molten stream occurs as a result of which the stream is longitudinally distributed over the entire length of the manifold. The longitudinal dimension of a manifold of multimanifold die 10 is of considerable magnitude, that is, typically of about 10 to 60 inches or more, with the resulting effect being that a stream exiting from the manifold is at a relatively greater pressure at a side-to-side midpoint than at the sides thereof.

The size of a manifold in terms of its cross-sectional area is determined by the required thermoplastic material throughput. Thus, with reference to FIG. 3, it can be seen that manifold 46 has a smaller cross-sectional area than manifold 48 for the reason that a higher material throughput through manifold 48 is desired in die 10.

Figure 4:
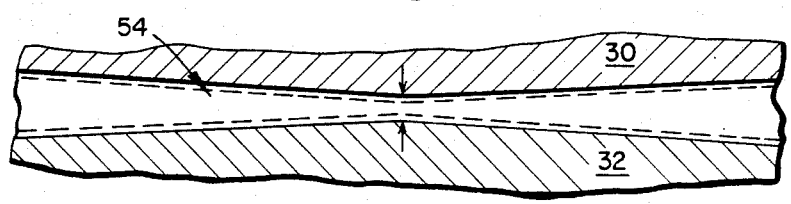
FIG. 4 is a magnified fragmentary view of a pressure compensating restriction channel of the die of FIG. 3 taken from the direction shown by the line 4—4, this view illustrating the difference in the dimensions of this restriction channel depending upon whether a thermoplastic material of high viscosity or low viscosity is passed through this channel.

Pressure compensating restriction channel 52 is located downstream from manifold 46 and is formed by a longitudinal wall 72 of head portion 30 of divider 26 and an inner wall 74 of die 10. Channel 52 is especially characterized by having increasing cross-sectional area from center 76 thereof to each end of the channel, with an end 78 being shown in FIG. 2. This feature of the channel is further illustrated in FIG. 4 in the case of pressure compensating restriction channel 54, with arrows being used in the Figure to designate the width at the center of channel 54. Moreover, as can be further seen from FIG. 4, the dimensions of a pressure compensating restriction channel are to be varied depending upon whether a resin of relatively higher or lower viscosity (dotted lines in FIG. 4 represent the dimensions for the lower viscosity resin) is to be passed through the channel. The variable cross-sectional area of channel 52 provides inverse resistance to flow to the thermoplastic stream that has exited from manifold 46 at a relatively greater pressure at a side-to-side midpoint than at the sides thereof. The precise cross-sectional dimension to be used for channel 52 is selected with regard to the viscosity of the particular resin to be passed through this channel so as to cause the molten stream to exit from channel 52 at substantially equal pressure from side to side. Hence, this channel subjects the molten stream to an inverse resistance to flow in such a way as to cause the stream to flow at substantially equal pressure from side to side. I believe that this is a necessary aspect of minimizing or eliminating the curtaining effect in a die.

Figure 5:
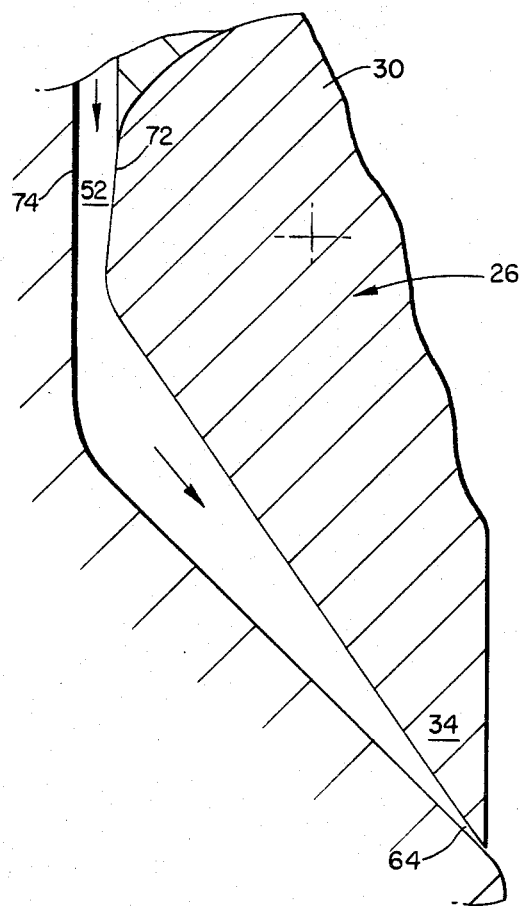
FIGS. 5 and 6 are magnified fragmentary views of a pressure compensating restriction channel, expansion chamber and tapered flow restriction channel of the die of FIG. 3, which show that the pressure compensating restriction channel is tapered regardless whether the tapered flow restriction channel is at a maximum or minimum flow restriction.
Figure 6:
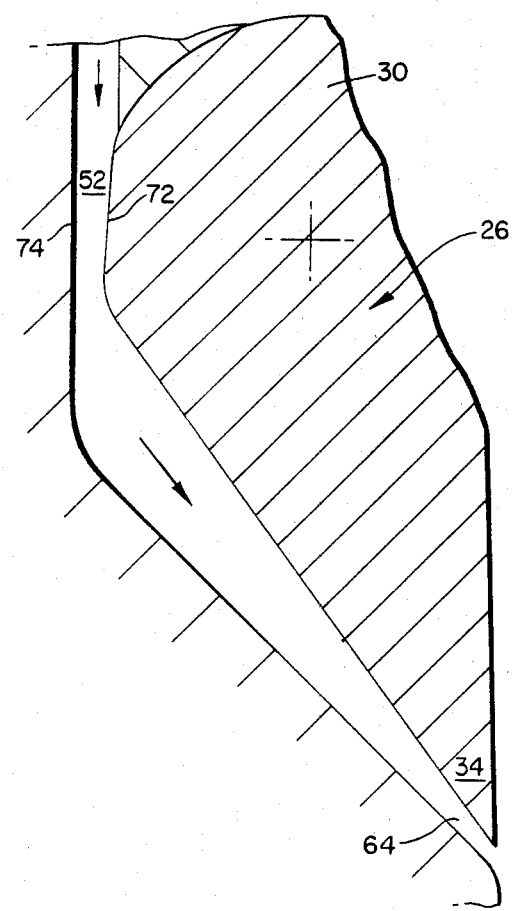

Referring to FIGS. 5 and 6, it can be seen that channel 52, when viewed in cross-section, is tapered in the direction of flow, regardless of whether downstream flow restriction channel 64 is at a minimum (FIG. 6) or maximum (FIG. 5) flow restriction, and that it provides relatively greater flow restriction when channel 64 is at the maximum flow restriction. Alternatively, channel 52, when viewed in cross-section, may be parallel when channel 64 is at the minimum flow restriction. The necessary configuration, from both a longitudinal and cross-sectional standpoint, is provided to channel 52 by longitudinal wall 72, with divider 26 typically having been machined to form this wall.

The pressure compensating restriction channel feeds the molten thermoplastic stream, which is now flowing at a pressure that is substantially equal from side to side, to expansion chamber 58. This chamber has a cross-sectional area that is greater than the area of any cross-section of channel 52. In fact, chamber 58, which is beneficially of substantially constant cross-sectional area from end to end, will be typically considerably greater in cross-sectional area than channel 52, as is illustrated in FIGS. 2 and 3. Hence, an important function provided by chamber 58 is that of expanding the thickness of the flowing molten stream so that, for example, the stream can be subsequently metered by flow restriction channel 64 to a desired cross-sectional thickness.

Expansion chamber 58 is formed by longitudinal wall 72 of an intermediate portion of divider 26 and inner wall 74 of die 10. An essential characteristic of the chamber is that it has a longitudinal dimension that maintains the molten stream at substantially equal pressure from side to side. Thus, chamber 58 will characteristically have the same longitudinal dimension as manifold chamber 46. It is possible, however, that there could be a minor deviation in the longitudinal dimension, provided that the substantially equal flow pressure effected by channel 52, is not adversely disturbed as the molten stream flows through expansion chamber 58.

From the preceding explanation concerning chamber 58, it can be understood that this chamber functions to expand the thickness of the flowing stream, while maintaining the stream at the substantially equal flow pressure. Moreover, it may be observed from FIGS. 2 and 3, that whereas the upper portion of chamber 58 is so configured as to provide for expansion of the stream thickness, the lower portion of the chamber is tapered, when viewed in cross-section, in the direction of flow restriction channel 64, with which it merges to provide a channel for the molten stream to flow to point of convergence 18.

Flow restriction channel 64 is also tapered, when viewed in cross-section, in the direction of point of convergence 18. This channel is of smaller cross-sectional area than chamber 58, and thus serves to thin the cross-sectional thickness of the expanded molten stream. Channel 64, which is advantageously of substantially constant cross-sectional area from end to end, is formed by longitudinal wall 72 of point portion 34 of divider 26 and inner wall 74 of die 10. The cross-sectional dimension of channel 64 is precisely regulated by pivoting of vane blade 26 in response to any difference between the flow rates of the molten streams passing through flow channels 12 and 14. The free floating vane blade is self balancing: it provides for a relatively wider channel 64 than 66 in response to a relatively higher viscosity molten stream in channel 12 than 14, for example. Channel 64 has a longitudinal dimension that maintains the molten stream at the substantially equal flow pressure. Accordingly, this channel will typically have substantially the same longitudinal dimension as manifold chamber 46. Again, conceivably there could be a slight variation in the longitudinal dimension, provided that the substantially equal flow pressure of the molten stream is not adversely disturbed as it passes through this channel.

From the above description of flow restriction channel 64, it will be understood that the molten stream exits from this channel at substantially equal flow pressure from side to side. Moreover, it will be understood that channel 64 functions to thin the expanded molten stream to a desired cross-sectional area, while maintaining the stream at the substantially equal flow pressure.

As a consequence of the location of channel 64 downstream from expansion chamber 58, a further function served by expansion chamber 58 is that of a back pressure cavity. Similarly, the location of pressure compensating restriction channel 52 causes manifold chamber 46 to function as a back pressure cavity.

As might be expected, a difficulty that confronted me in inventing the multimanifold extrusion die of the present invention, was that of eliminating or minimizing the curtaining effect, while at the same time retaining the advances in the art provided by the multimanifold die of FIG. 3 of my U.S. Pat. Nos. 4,152,387 and 4,197,069. Advantageously, the present invention achieves this objective.

Furthermore, the present invention concomitantly makes possible a further improvement: it provides for convergence of molten thermoplastic streams at substantially equal flow velocities without external adjustment of the die. This additional advance in the art is a further benefit of the configuration that I give to each flow channel for the purpose of minimizing or eliminating the curtaining effect. More precisely, the configuration of the manifold chamber, the pressure compensating restriction channel, the expansion chamber and the tapered flow restriction channel enables the vanes to be free floating and pivot in response to a flow rate differential. In contrast, it is necessary in the die of FIG. 3 for the vanes to be manually adjusted and locked into position, unless the flow rate differential will be insignificant or zero.

An additional advantage of my preferred die is that each divider is removable and may be replaced with an interchangeable divider, in order to provide die 10 with a pressure compensating restriction channel having a configuration precisely suited to the viscosity of a molten resin to be passed through the channel. This avoids the necessity of otherwise using a completely different die having a pressure compensating restriction channel of the needed configuration. This advantage will reduce cost in terms of both time and money.

As a side point with respect to the adaptor of my U.S. Pat. Nos. 4,152,387 and 4,197,069, the layers of a laminated product made by use of the adaptor exhibit the curtaining effect even though a molten stream exerts equal pressure along the length of the elongated flow restriction channel thereof.

In operation, a molten thermoplastic stream enters flow channel 12, and passes through manifold chamber 46, in which it is longitudinally spread and out of which it flows at relatively greater pressure at a side-to-side midpoint than at the sides thereof. The molten stream next passes through pressure compensating restriction channel 52, which subjects the stream to an inverse resistance to flow as a result of which the stream leaves channel 52 flowing at substantially equal pressure from side to side. The stream then passes through expansion chamber 58, in which the cross-sectional thickness of the stream is expanded, while the substantially equal flow pressure is maintained. The expanded stream is subsequently passed through flow restriction channel 64, in which the cross-sectional thickness is thinned to a desired cross-sectional dimension. Next, the thinned molten stream is converged at point of convergence 18 with two other molten streams each of which is also flowing at substantially equal pressure from side to side. At the point of convergence, the molten streams have substantially equal velocities. The resulting melt-laminate is passed through preland channel 20, then through land channel 22, and finally exits from die 10 at opening 24.

In my process for minimizing or eliminating the curtaining effect in the melt-lamination of resins, the essential steps are as follows. A molten thermoplastic stream that is flowing at a relatively greater pressure at a side-to-side midpoint than at the sides thereof, is subjected to an inverse resistance to flow whereby the molten stream is caused to flow at substantially equal pressure from side to side. The thickness of the stream is then expanded, while the substantially equal flow pressure is maintained. With this flow pressure continuing to be maintained, the cross-sectional thickness of the expanded stream is thinned to a desired cross-sectional dimension. The thinned molten stream is converged with at least one other thinned molten stream that is flowing at substantially equal pressure from side to side to form a melt-laminate. The substantially equal flow pressure of each stream in the melt-laminate is then maintained until the melt-laminate exits from the die. In a multimanifold die in accordance with the present invention, this last step is achieved by providing the exit channel with a longitudinal dimension that maintains each layer of the melt-laminate at the substantially equal flow pressure. Typically, the exit channel will have the same longitudinal dimension as any of the manifold chambers, which characteristically will all have the same longitudinal dimension.

In FIG. 2, I show each of the divider head portions provided with an adjusting device, shown as 38 and 40. As is clear from the above description of my invention, these adjusting devices are not necessary, as the dividers are free floating and provide any required adjustment in the relative widths of the adjacent flow channels in response to any flow rate differential. Arrows 42 and 44 show that these adjusting devices could be moved clockwise or counterclockwise.

Flow instability between the layered melt streams of the melt-laminate may be reduced by locating point of convergence 18 as close as possible to opening 24, that is, by making the exit channel as short as possible, for example, about 1½ inches. Otherwise, the exit channel may be, for purposes of illustration, about 4–6 inches.

In the preceding description of the present invention, there is shown and essentially described only one preferred embodiment of my invention, but as mentioned above, it is to be understood that the invention is capable of changes or modifications within the scope of the inventive concept expressed herein. Several changes or modifications have been briefly mentioned for purposes of illustration.

I claim:

1. A multimanifold extrusion die for minimizing or eliminating the curtaining effect that moreover automatically provides for convergence of molten thermoplastic streams at substantially equal flow velocities, said multimanifold extrusion die comprising
    (a) a first and a second flow channel, which traverse said die and eventually converge at a point of convergence within said die; and
    (b) free floating, pivoting divider means disposed between said flow channels;
    wherein each of said flow channels comprises a manifold chamber situated upstream from said divider means, and further comprises in descending downstream order, a pressure compensating restriction channel, an expansion chamber, and a tapered flow restriction channel; said pressure compensating restriction channel being formed in part by a head portion of said divider means; and said expansion chamber having a cross-sectional area greater than that of any cross-section of said pressure compensating restriction channel, and being also of greater cross-sectional area than said tapered flow restriction channel;
    wherein said manifold chamber has a longitudinal dimension of sufficient magnitude that a molten thermoplastic stream exiting from said manifold chamber is at a relatively greater pressure at a side-to-side midpoint than at the sides thereof;
    wherein said pressure compensating restriction channel is of increasing cross-sectional area from the center to each end thereof so as to provide inverse resistance to flow whereby the molten stream, which is at said relatively greater pressure at said midpoint prior to flowing through said pressure compensating restriction channel, is caused to exit from this channel at substantially equal pressure from side to side;
    wherein said expansion chamber and said tapered flow restriction channel have a longitudinal dimension that maintains the molten stream at said substantially equal pressure;
    whereby a molten stream exits at said substantially equal pressure from said tapered flow restriction channel of each of said flow channels, and convergence of the molten streams forms a layered melt stream that is flowing at said substantially equal pressure;
    said free floating divider means automatically pivoting in response to any difference between the flow rates of said molten streams whereby said convergence is at substantially equal flow velocities.

2. The extrusion die of claim 1, wherein each of said flow channels comprises a coat-hanger type manifold.

3. The extrusion die of claim 1, wherein said expansion chamber has substantially the same longitudinal dimension as said manifold chamber.

4. The extrusion die of claim 1, wherein said divider means is adapted to be removable and is therefore able to be replaced by an interchangeable divider means.

5. The extrusion die of claim 1, wherein a third flow channel traverses said die and eventually converges with said first and second flow channels at said point of convergence.

* * * * *